(12) United States Patent
Belloso

(10) Patent No.: US 10,144,411 B2
(45) Date of Patent: Dec. 4, 2018

(54) VEHICLE SYSTEM

(71) Applicant: Gregorio M. Belloso, Salisbury, MD (US)

(72) Inventor: Gregorio M. Belloso, Salisbury, MD (US)

( * ) Notice: Subject to any disclaimer, the term of this patent is extended or adjusted under 35 U.S.C. 154(b) by 136 days.

(21) Appl. No.: 15/406,023

(22) Filed: Jan. 13, 2017

(65) Prior Publication Data

US 2018/0201249 A1 Jul. 19, 2018

(51) Int. Cl.
| | |
|---|---|
| *B60W 20/10* | (2016.01) |
| *B60K 5/08* | (2006.01) |
| *B60K 6/24* | (2007.10) |
| *B60K 26/02* | (2006.01) |
| *B60K 6/48* | (2007.10) |
| *B60K 6/36* | (2007.10) |
| *B60K 6/52* | (2007.10) |
| *B60K 6/40* | (2007.10) |
| *B60K 7/00* | (2006.01) |
| *B60W 10/06* | (2006.01) |
| *B60W 10/08* | (2006.01) |
| *B60W 10/02* | (2006.01) |

(52) U.S. Cl.
CPC ............... *B60W 20/10* (2013.01); *B60K 5/08* (2013.01); *B60K 6/24* (2013.01); *B60K 6/36* (2013.01); *B60K 6/40* (2013.01); *B60K 6/48* (2013.01); *B60K 6/52* (2013.01); *B60K 7/0007* (2013.01); *B60K 26/02* (2013.01); *B60W 10/02* (2013.01); *B60W 10/06* (2013.01); *B60W 10/08* (2013.01); *B60K 2007/0092* (2013.01); *B60W 2540/10* (2013.01); *B60W 2710/02* (2013.01); *B60Y 2200/92* (2013.01); *Y10S 903/93* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,492,189 | A * | 2/1996 | Kriegler | B60K 6/12 180/65.23 |
| 6,179,078 | B1 * | 1/2001 | Belloso | B60K 1/00 180/65.285 |
| 6,303,056 | B1 * | 10/2001 | Fan | B82Y 30/00 252/299.01 |
| 6,814,686 | B2 * | 11/2004 | Carriere | F02B 73/00 477/6 |
| 6,852,062 | B1 * | 2/2005 | Ahner | B60K 5/08 477/2 |
| 7,181,912 | B2 * | 2/2007 | Mori | B60K 8/00 60/517 |
| 7,325,638 | B1 * | 2/2008 | Belloso | B60K 5/08 180/14.2 |
| 7,641,584 | B1 * | 1/2010 | Belloso | B60K 5/08 477/6 |
| 9,308,810 | B1 * | 4/2016 | Kurdy | B60K 7/00 |

(Continued)

*Primary Examiner* — Redhwan K Mawari

(57) ABSTRACT

A vehicle system has a pedal, a first internal combustion engine, a second internal combustion engine and an electric engine. The first internal combustion engine, the second internal combustion engine and the electric engine are respectively coupled with the pedal. The first internal combustion engine, the second internal combustion engine and the electric engine are operatively supplementary to one another.

18 Claims, 7 Drawing Sheets

(56) References Cited

U.S. PATENT DOCUMENTS

| | | | |
|---|---|---|---|
| 2009/0078083 A1* | 3/2009 | Nishimoto | B60K 17/34 74/606 R |
| 2014/0195092 A1* | 7/2014 | Saito | B60W 10/02 701/22 |
| 2016/0068101 A1* | 3/2016 | Holloway | B60Q 5/008 701/36 |
| 2018/0147938 A1* | 5/2018 | Stormer | B60K 5/08 |

* cited by examiner

VEHICLE SYSTEM

FIELD OF THE INVENTION

The present invention relates generally to a vehicle system. More specifically, the present invention relates to a vehicle system having a pedal, a first internal combustion engine, a second internal combustion engine and an electric engine.

BACKGROUND OF THE INVENTION

Many types of motor vehicles have been developed to improve the fuel efficiency of motor vehicles. In general, an improvement in fuel economy is accomplished through severe down-sizing of the internal combustion engine of the vehicle. This permits the vehicle to travel greater distances on reduced amount of fuel. This, however, results in severely slow acceleration which is unacceptable to the buying public.

Various solutions have been proposed to solve this problem. One solution involves use of two or more internal combustion engines in the vehicle. One engine is down-sized and is used to permit the vehicle to travel greater distances on reduced amount of fuel. The additional engine(s) provides more power for faster acceleration, hill-climbing, etc.

Examples of vehicles involving two or more internal combustion engines are found in the following U.S. Pat. Nos. 6,179,078; 7,270,030; 7,080,622; 8,561,744 and 7,410,021. Unlike the present invention, none of them discloses the use of an electric motor to supply additional power for traction and to provide means for regenerative braking to recharge batteries.

Another solution involves the use of one or more electric motors adapted to augment the output of the internal combustion engines when more power is needed. These are known as hybrid vehicles. Hybrid vehicles tend to be more expensive than a non-hybrid vehicle of comparable size and power because of the high cost of the required batteries and associated electrical components. They also tend to have poorer acceleration and mechanical performance, for the same reason. They do have an advantage over non-hybrid vehicles by having the ability to recover energy from the kinetic energy of the moving vehicle through regenerative braking.

Examples of hybrid vehicles involving one internal combustion engine and one electric motor are found in the following U.S. Pat. Nos. 5,513,719; 5,788,003; 6,044,922; 6,209,672; 6,328,671; 6,668,954; 6,706,789; 6,712,165; 6,958,549; 6,995,480; 7,004,273; and 7,028,796.

Hybrid vehicles involving a single internal combustion engine in association with two or more electric motors are disclosed in the following U.S. Pat. Nos. 5,343,971; 6,717,281; 6,856,025; 6,959,237; 6,962,224; 6,965,173; and 7,044,255.

None of these patents disclose a vehicle having more than one internal combustion engine, whereas the vehicle of the present invention has a plurality of internal combustion engines in addition to an electric motor to propel the vehicle.

U.S. Pat. No. 7,647,994 to Belloso discloses a vehicle having two internal combustion engines and an electric motor, however, only the first internal combustion engine is coupled to the speed change transmission. The second internal combustion engine is coupled to a generator and it is used simply to recharge the hybrid battery. This is unlike the present invention wherein both the first and second internal combustion engines are coupled to the speed change transmission and directly propel the vehicle.

U.S. Pat. No. 7,641,584 to Belloso discloses a vehicle with primary cruiser engine and auxiliary accelerator engine. The first five embodiments do not involve the use of an electric motor to help propel the vehicle and are, therefore, unlike the present invention. Although the fifth and sixth alternative embodiments involve the use of two internal combustion engines and an electric motor, they differ from the present invention because the secondary ("accelerator") engine in each case is used only to drive the electric generator to replenish the charge of the battery and they are not coupled to the speed change transmission, whereas in the present invention both the primary engine and the secondary engine are mechanically coupled to the speed change transmission and directly propel the vehicle.

U.S. Pat. No. 7,325,638 to Belloso discloses a motor vehicle with a primary engine for acceleration and a secondary engine augmented by an electric motor for cruising. Unlike the present invention wherein both the primary and secondary engines are coupled to the speed change transmission, the secondary engine of U.S. Pat. No. 7,325,638 is not coupled to the speed change transmission. Instead, it is directly coupled to the differential, completely bypassing the speed change transmission. Power from the secondary engine, therefore, does not benefit from the torque multiplication afforded by the speed change transmission during acceleration.

It is accordingly an objective of this invention to provide a vehicle capable of traveling at cruising speed for long distances with maximum fuel economy through maximal down-sizing of the engine specifically designated for cruising. Maximal down-sizing of the primary ("cruiser") engine is made possible in this invention because its power is not needed for acceleration, hill-climbing, etc., since there is a designated secondary ("accelerator") engine to supply the additional power.

It is another objective of this invention to provide a vehicle having sufficient power for quick acceleration and good hill-climbing abilities through the use of a sufficiently powerful secondary engine releasably coupled to the speed change transmission.

It is an additional objective of this invention to further improve the acceleration of the vehicle through use of an electric motor-generator powered by a rechargeable battery to provide additional power for acceleration.

It is still an additional objective of this invention to further improve fuel economy by recharging the battery through regenerative braking with the motor-generator in generator mode.

It is a still further objective of this invention to provide a fuel-efficient hybrid vehicle having less expensive lower capacity batteries and electric motors.

These objectives and other objectives and advantages of the invention will be apparent from the following description.

SUMMARY OF THE INVENTION

In summary, the above and other beneficial objectives and advantages are accomplished in accordance with the present invention by a motor vehicle having a chassis, a pair of front wheels and a pair of rear wheels, the front wheels, or the rear wheels, or the front and rear wheels serving as driving wheels, and an improved power train comprising:

a) a primary internal combustion engine mounted on said chassis, said primary engine being of suitable size and power so that when operating at maximum fuel efficiency it is capable of maintaining said vehicle at an acceptable cruising speed with maximal fuel efficiency, and associated mechanisms for transmitting power to said driving wheels.

b) a secondary internal combustion engine mounted on said chassis, said secondary engine being of suitable size and power so that when operated together with said primary internal combustion engine their combined power will be sufficient to accelerate said vehicle to cruising speed in acceptable acceleration rate and provide acceptable hill-climbing and load-carrying capacity, and associated mechanism for transmitting power to said speed change transmission, thence to said driving wheels, c) an electric motor mounted on said chassis, an associated rechargeable storage battery which activates said motor, a generator which recharges said battery, and power transfer mechanism for transmitting power from said electric motor to said driving wheels to provide supplemental power for acceleration and cruising, and d) mechanisms for supplying adjustably increasing supply of fuel to said primary internal combustion engine when said gas pedal is lightly to moderately depressed, circuits for supplying adjustably increasing supply of electric current from said battery to said electric motor when said gas pedal is further more moderately depressed, and mechanisms for supplying adjustably increasing supply of fuel to said secondary internal combustion engine when said gas pedal is further more deeply depressed.

The fundamental feature of this invention is that it uses a hybrid system comprised of said primary engine and electric motor mainly to maintain the vehicle at cruising speed, and to provide limited assistance for acceleration. Since the power needed for cruising is much less than the power needed for acceleration and passing, using the hybrid system mainly for cruising results in substantial improvement in fuel economy. It also permits correspondingly substantial down-sizing of both the primary engine and the electric motor. For example, a regular car weighing about 3,200 pounds will need only about 80 HP of power to maintain it at regular legal highway cruising speed. This can be easily supplied by a 65 HP primary engine and a 15 kW electric motor. This is much less than the 120 HP engine and 30 kW electric motor often used in current Hybrid Electric Vehicles which have to use this hybrid system for acceleration as well as cruising. The present invention makes it possible to substantially down-size the primary engine and the electric motor and maximize their fuel economy for cruising because the power train includes a powerful secondary internal combustion engine to provide substantial additional power for acceleration. This further improves fuel economy and reduces the cost of the hybrid batteries.

BRIEF DESCRIPTION OF THE DRAWINGS

With these and other advantages in view, the invention is disclosed in the following description which will be more fully understood when read in conjunction with the following drawings in which.

For clarity of illustration, details which are not relevant to the invention, such as control linkages, gearshift linkages, internal parts of speed change transmissions, differentials and transaxles, engine mounts, suspension, etc., have been largely omitted from these drawings.

DETAILED DESCRIPTION OF THE INVENTION

Figure 1:
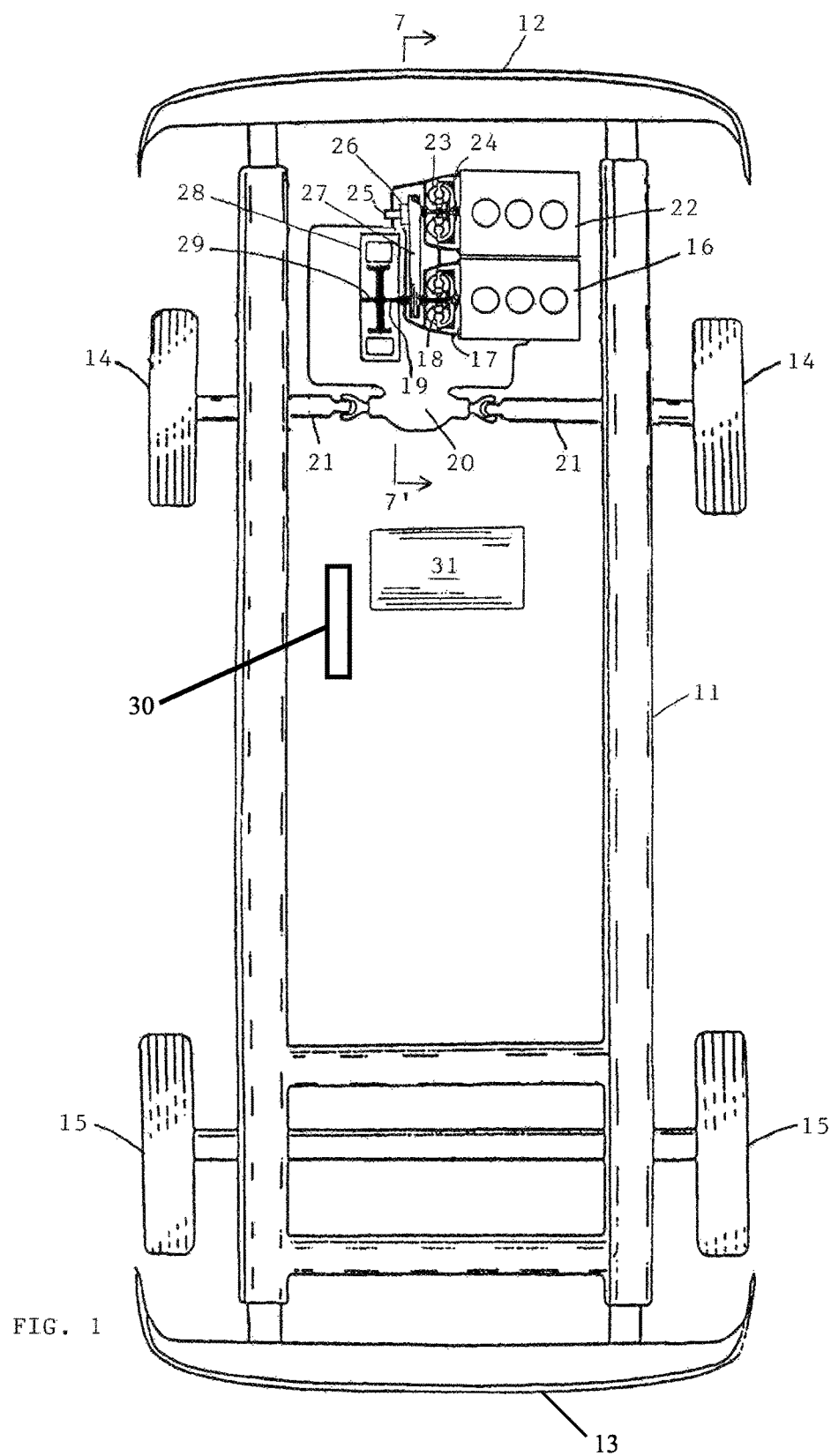
FIG. 1 is a schematic top view of a motor vehicle equipped with an embodiment of an improved power train of this invention.

Referring now to the above drawings wherein one character designates one part of the vehicle, FIG. 1 shows a vehicular chassis 11 connected to a bumper 12 and another bumper 13 and supported by a pair of wheels 14 and another pair of wheels 15. One of the bumper 12 and the another bumper 13 is a front bumper, and the other one of the bumper 12 and the another bumper 13 is a rear bumper. One of the wheel 14 and the wheel 15 is a front wheel, and the other one of the wheel 14 and the wheel 15 is a rear wheel.

Figure 7:
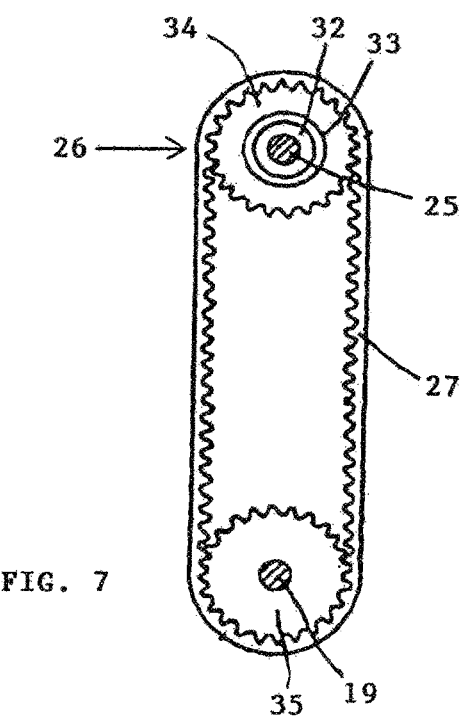
FIG. 7 is a magnified sectional view along line 7-7' of FIG. 1.

Referring to FIGS. 1 and 7, a primary engine 16, mounted on the chassis 11, has a flywheel 17 coupled to a primary fluid torque converter 18 whose output shaft 19 transmits the power from the primary engine 16 to a transaxle 20, thence to two halfshafts 21 and the pair of wheels 14. The transaxle 20 is a combination of a speed change transmission and a differential. A secondary engine 22 is mounted on the chassis 11, and an axis of rotation of crankshaft of the secondary engine 22 is parallel to an axis of rotation of a crankshaft of the primary engine 16. The secondary engine 22 is mounted alongside the primary engine 16, and the crankshafts of both engines rotate co-directionally. A secondary fluid torque converter 23 is coupled to a flywheel 24 of the secondary engine 22, and its output shaft 25 is keyed into a cylindrical inner race 32 of a sprag clutch 26. A cylindrical outer race 33 of the sprag clutch 26 is fixedly connected to a drive gearing sprocket 34 which is connected by an endless gearing chain 27 to a driven gearing sprocket 35 which is fixedly mounted on the output shaft 19 of the primary fluid torque converter 18.

A motor-generator 28 is mounted between the primary fluid torque converter 18 and the transaxle 20 so that its axial shaft 29 becomes an integral part of the output shaft 19 of the primary fluid torque converter 18. It is the axial shaft 29 that transmits power from the primary engine 16, the motor-generator 28 and the secondary engine 22 to the transaxle 20.

Figure 6:
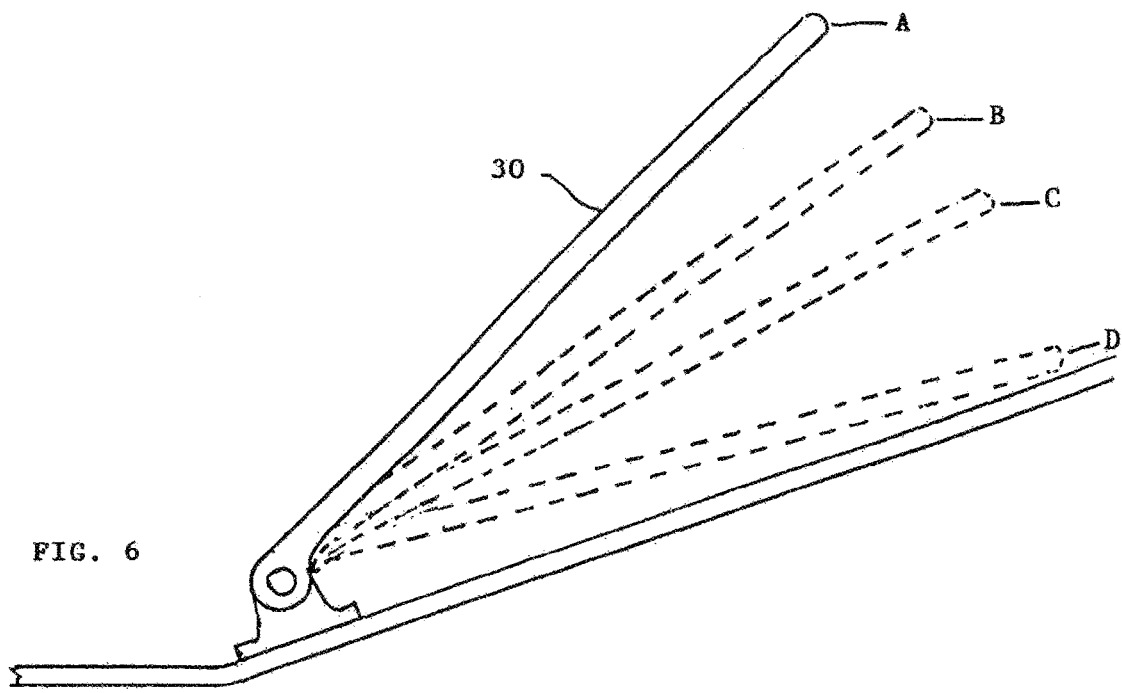
FIG. 6 is a schematic representation of a gas pedal in an undepressed position, a slightly depressed position, a moderately depressed position and a fully depressed position.

A driver controls the operation of the primary engine 16, the secondary engine 22 and the motor-generator 28 through manipulation of a gas pedal 30 as shown in FIG. 1 and FIG. 6.

Figure 8:
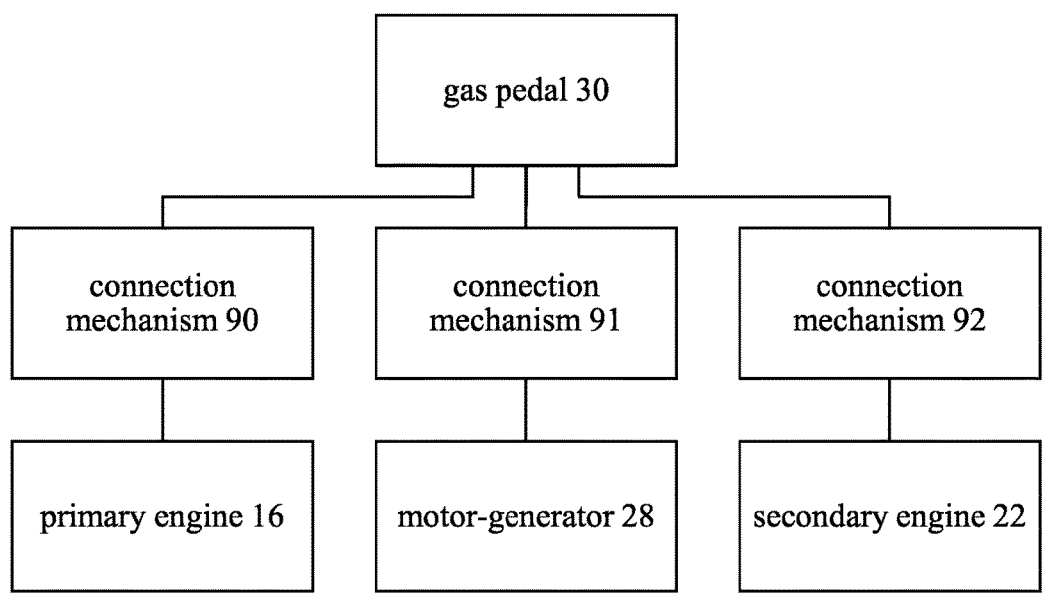
FIG. 8 is a schematic representation of a gas pedal coupled with two engines and a motor-generator through connection mechanisms.

FIG. 6 shows the gas pedal 30 in an undepressed position A, a slightly depressed position B, a moderately depressed position C and a fully depressed position D, the latter positions being shown in phantom dashed lines. As shown in FIG. 8, the gas pedal 30 controls the fuel supply to the primary engine 16 through a connection mechanism 90; it controls the supply of electric current to the motor-generator 28 through a connection mechanism 91, and it controls the fuel supply to the secondary engine 22 through a connection mechanism 92.

When the gas pedal 30 is in the undepressed position A, no fuel is delivered to the primary engine 16, nor to the secondary engine 22, and no electric current is supplied from a rechargeable battery 31 to the motor-generator 28. As the gas pedal 30 is depressed below the undepressed position A and above the slightly depressed position B, increasing flow of fuel is supplied to the primary engine 16, so that as the gas pedal 30 reaches the slightly depressed position B, the primary engine 16 would be operating at a maximum power capacity. Further depression of the gas pedal 30 would not cause any further increase of fuel supply to the primary engine 16, but the primary engine 16 would continue to operate at maximum capacity until the gas pedal 30 is raised above the slightly depressed position B whereupon decreasing flow of fuel would be supplied to the primary engine 16 until the gas pedal 30 reaches the undepressed position A at which point no fuel would be supplied to the primary engine 16 unless the fuel supply system has been adjusted to maintain the primary engine 16 at idle speed when the gas pedal 30 is returned to the undepressed position A.

When the gas pedal 30 is depressed in and/or below the slightly depressed position B, the circuit between the motor-generator 28 and the rechargeable battery 31 would be closed, and increasing flow of electric current would be supplied from the rechargeable battery 31 to the motor-generator 28. This flow of electric current would be regulated by a rheostat associated with the gas pedal 30.

The electric current supply to the motor-generator 28 is adjusted, so that when the gas pedal 30 reaches the moderately depressed position C, maximal flow of current would be supplied to the motor-generator 28 to make it operate at its maximal operating capacity. When the gas pedal 30 is further depressed below the moderately depressed position C, no further increase in current flow would be supplied to the motor-generator 28, however the current supply would be maintained to let the motor-generator 28 continue operating at its maximal operating capacity until such time as when the gas pedal 30 is raised above the moderately depressed position C whereupon decreasing flow of current could be supplied, and finally cut off when the gas pedal 30 is raised above the slightly depressed position B.

When the gas pedal 30 is depressed in and/or below the moderately depressed position C, the secondary engine 22 would be started, and as the gas pedal 30 is further depressed increasing flow of fuel would be supplied to the secondary engine 22. Soon the speed of rotation of the secondary engine 22 would exceed the speed of the primary engine 16, and as soon as this happens the sprag clutch 26 would automatically engage and begin transmitting power from the secondary engine 22 to the output shaft 19 to assist in powering the vehicle.

The structure and operation of the sprag clutch 26 is best illustrated in FIG. 7 which is a magnified sectional view taken along line 7-7' of FIG. 1. The sprag clutch 26 comprises the cylindrical inner race 32 placed inside the cylindrical outer race 33. Asymmetrical sprags are placed in the space between the cylindrical inner race 32 and the cylindrical outer race 33. The asymmetrical sprags are so designed that they permit free rotation of one race relative to the other race in one direction but they engage and prevent free rotation when the direction of rotation is reversed. As stated earlier, the cylindrical inner race 32 is keyed to the output shaft 25 of the secondary fluid torque converter 23. The cylindrical outer race 33 is fixedly connected to the drive gearing sprocket 34. The endless gearing chain 27 connects the drive gearing sprocket 34 to the driven gearing sprocket 35 which is keyed to the output shaft 19. The result is that when the secondary engine 22 is stopped or running in slow idle speed and the primary engine 16 is running at a faster speed, the sprag clutch 26 would be disengaged and would allow gearing the endless gearing chain 27 and the cylindrical outer race 33 to rotate freely over the cylindrical inner race 32. When the secondary engine 22 is speeded up to exceed the speed of the primary engine 16, the sprag clutch 26 would automatically engage and add the power of the secondary engine 22 to that of the primary engine 16 and that of the motor-generator 28.

To operate the vehicle, the ignition switch is turned on and the primary engine 16 is started. The transmission is shifted to "drive" in the usual manner and the gas pedal 30 is depressed to urge the vehicle forward. If the gas pedal 30 is depressed to in and/or below the slightly depressed position B but above the moderately depressed position C, the primary engine 16 will be operating up to its maximum rated capacity and the motor-generator 28 will be supplied with electric current from the rechargeable battery 31 to supply additional power. The combined power will be transmitted via the axial shaft 19 to the transaxle 20 thence through the two halfshafts 21 to the pair of wheels 14 to accelerate the vehicle forward. To accelerate faster the operator needs only to depress the gas pedal 30 down in and/or past the moderately depressed position C which starts the secondary engine 22 and supplies it with increasing supply of fuel and accelerates it to operational speed. Power from the secondary engine 22 is transmitted via the secondary fluid torque converter 23 thence to the output shaft 25 which rotates the cylindrical inner race 32 causing it to automatically engage the cylindrical outer race 33 of the sprag clutch 26 which then transmits power via the drive gearing sprocket 34 to the endless gearing chain 27 thence to the driven gearing sprocket 35 to the output shaft 19 and the axial shaft 29, the transaxle 20, the two halfshafts 21 and the pair of wheels 14 to accelerate the vehicle in a still faster rate.

After the vehicle reaches cruising speed, the operator may let the gas pedal 30 rise above the slightly depressed position B and let the vehicle cruise economically on power from the primary engine 16 alone, perhaps supplemented from time to time with power from the motor-generator 28. During moments when he would need still additional power, for passing or climbing a grade, etc., he would need only to depress the gas pedal 30 in and/or below the moderately depressed position C to avail of additional power from the secondary engine 22.

Figure 2:
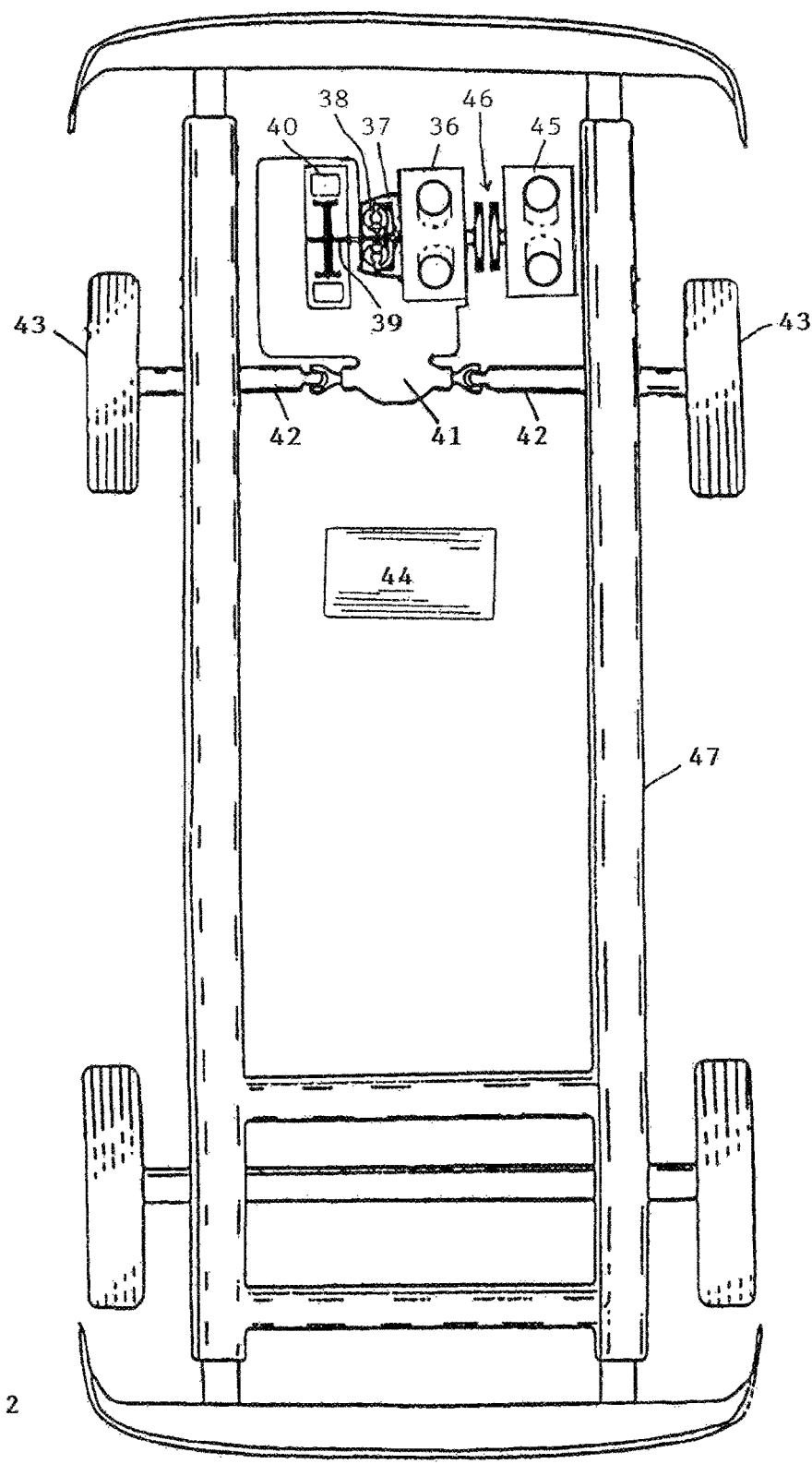
FIG. 2 is a schematic top view of a motor vehicle equipped with an alternative embodiment of an improved power train of this invention.

FIG. 2 shows a first alternative embodiment of the invention showing a vehicular chassis 47 and a primary engine 36 mounted on the vehicular chassis 47. The primary engine 36 is a two-cylinder engine with cylinders arranged in a "V" configuration. Its flywheel 37 is coupled to a fluid torque converter 38 whose output shaft 39 also serves as an axial shaft of a motor-generator 40 and further serves as an input shaft of a transaxle 41. Power from the transaxle 41 is transmitted via two halfshafts 42 to a pair of wheels 43 to propel the vehicle.

A secondary engine 45 is also a two-cylinder engine with cylinders arranged in a "V" configuration. Its output shaft is coupled via a releasable clutch mechanism 46 to a front end of a crankshaft of the primary engine 36, so that when the releasable clutch mechanism 46 is engaged, the power from the secondary engine 45 is added to power from the primary engine 36 and power from a motor-generator 40 to propel the vehicle.

Control of this vehicle is similar to that of the preceding embodiment, and the operation of the primary engine 36, the motor-generator 40 and secondary the engine 45 is controlled by manipulation of the gas pedal 30 of FIG. 6. When the gas pedal 30 is in the undepressed position A, no fuel is supplied to the primary engine 36 and the secondary engine 45, and no electric current is supplied to the motor-generator 40. When the gas pedal 30 is depressed towards the slightly depressed position B, increasing flow of fuel is supplied to the primary engine 36, and when it is further depressed in and/or past the slightly depressed position B towards the moderately depressed position C, increasing flow of electric current is supplied to the motor-generator 40. When the gas pedal 30 is depressed in and/or past the moderately depressed position C, the secondary engine 45 is started and supplied with fuel and releasable clutch mechanism 46 is engaged. As the gas pedal 30 is depressed in and/or past the moderately depressed position C towards the fully depressed position D, increasing flow of fuel is supplied to the secondary engine 45.

The reverse happens when the gas pedal 30 is raised from the fully depressed position D towards the undepressed position A. Firstly, as the gas pedal 30 rises above the fully depressed position D, decreasing flow of fuel is supplied to the secondary engine 45, and when it reaches the moderately depressed position C, fuel flow is stopped and the secondary engine 45 stops running. At the same time, the releasable clutch mechanism 46 is disengaged, thereby completely decoupling the secondary engine 45 from the primary engine 36. When the gas pedal 30 proceeds from the moderately depressed position C towards the slightly depressed position B, decreasing flow of electric current is supplied to the motor-generator 40 from a rechargeable battery 44 until the gas pedal 30 rises above the slightly depressed position B whereupon the supply of current is stopped altogether. As the gas pedal 30 rises above the slightly depressed position B, decreasing flow of fuel is supplied to the primary engine 36 until the gas pedal 30 reaches the undepressed position A whereupon only enough fuel is supplied to the primary engine 36 to keep it running at idle speed.

To operate the vehicle, the ignition switch is turned on and the primary engine 36 is started. The transmission is shifted to "drive" and the gas pedal 30 is depressed to urge the vehicle forward in the usual manner on power from the primary engine 36. If the operator wishes to accelerate faster he may depress the gas pedal 30 in and/or past the slightly depressed position B to avail of power from the motor-generator 40, or he may depress it in and/or below the moderately depressed position C to also avail of power from the secondary engine 45 and accelerate even faster. To continue to travel economically at cruising speed, he simply raises the gas pedal 30 up to a point between the undepressed position A and the slightly depressed position B to cruise on power from the primary engine 36 alone, perhaps supplemented as needed with power from the motor-generator 40 which he accesses by simply dipping the gas pedal 30 in and/or below the slightly depressed position B.

Figure 3:
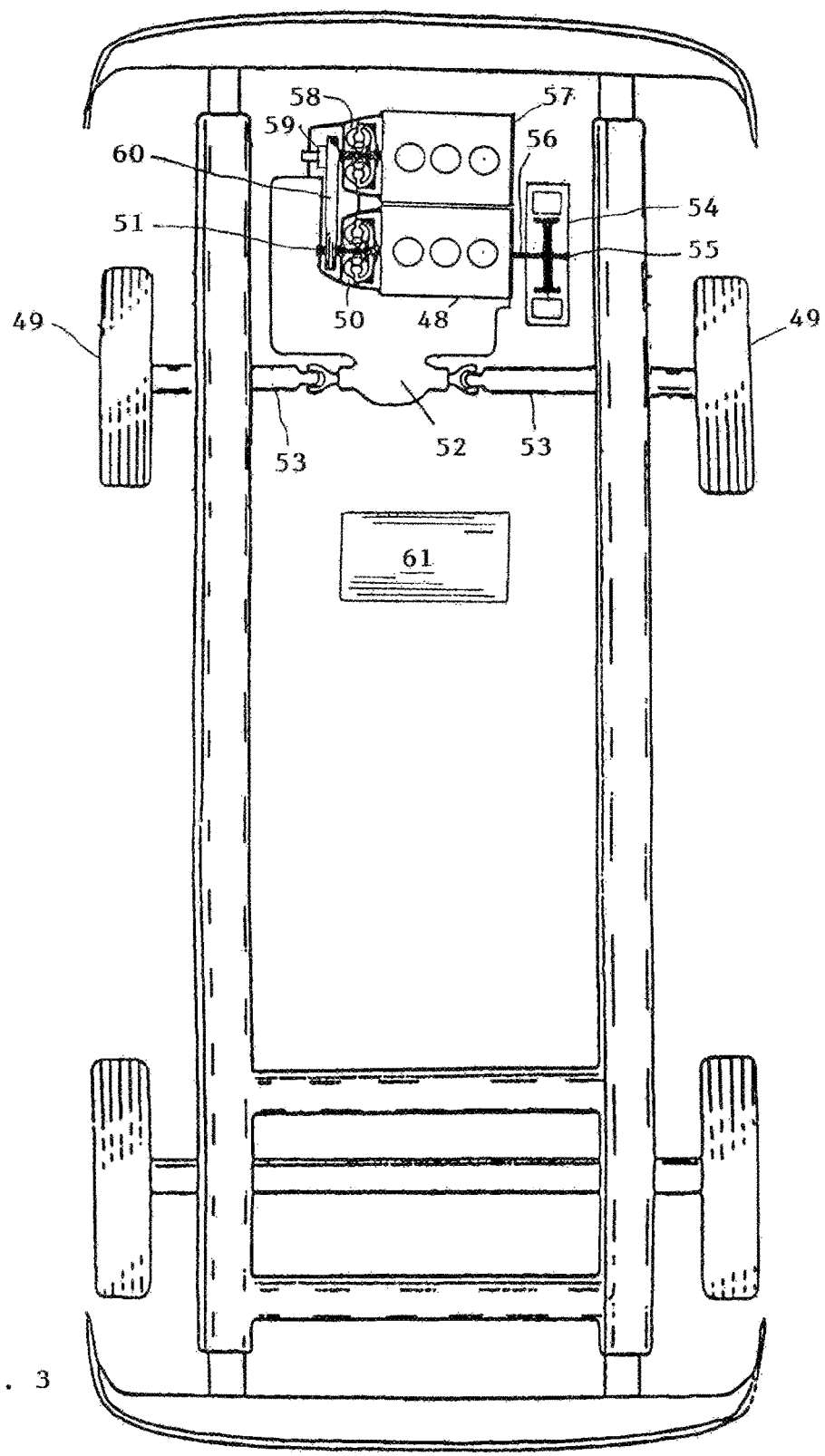
FIG. 3 is a schematic top view of a motor vehicle equipped with a second alternative embodiment of an improved power train of this invention.

FIG. 3 shows a second alternative embodiment of the present invention. A primary engine 48 transmits power to a pair of wheels 49, a primary fluid torque converter 50, an output shaft 51, a transaxle 52 and two halfshafts 53 in the conventional manner. A motor-generator 54 is coaxially coupled to the primary engine 48 by fixedly connecting its axial shaft 55 to a front end of a crankshaft 56 of the primary engine 48. A secondary engine 57 is mounted parallel to the primary engine 48. Power from the secondary engine 57 is transmitted via a secondary fluid torque converter 58 whose output shaft is keyed to a cylindrical inner race of a sprag clutch 59 and whose cylindrical outer race is geared to an endless gearing chain 60 which is geared to a driven gearing sprocket fixedly mounted on the output shaft 51 thereby transmitting power from the secondary engine 57 to the transaxle 52 whenever the sprag clutch 59 is engaged. The sprag clutch 59 automatically engages when the speed of its cylindrical inner race (which is related to the speed of the secondary engine 57) exceeds the speed of its cylindrical outer race, which depends on the speed of the primary engine 48.

Operation of the primary engine 48, the secondary engine 57 and the motor-generator 54 is controlled via the gas pedal 30 as shown in FIG. 6, similar to the preceding embodiments.

To operate the vehicle, the primary engine 48 is started and the transaxle 52 is shifted to "drive." The gas pedal 30 is then depressed to urge the vehicle forward. As the gas pedal 30 moves from the undepressed position A towards the slightly depressed position B, increasing flow of fuel is supplied to the primary engine 48 and the vehicle accelerates on power from the primary engine 48 alone. When the gas pedal 30 is depressed in and/or below the slightly depressed position B, increasing flow of electricity is supplied from a rechargeable battery 61 to the motor-generator 54 which then transmits increasing amount of power to the transaxle 52 via the crankshaft 56 of the primary engine 48, the primary fluid torque converter 50 and the output shaft 51 to assist in acceleration. To accelerate even faster, the gas pedal 30 is depressed in and/or past the moderately depressed position C towards the fully depressed position D. When the gas pedal 30 is depressed in and/or below the moderately depressed position C, the secondary engine 57 is automatically started, and increasing flow of fuel is supplied to the secondary engine 57, speeding it up. Power from the secondary engine 57 is then transmitted to the transaxle 52 via the secondary fluid torque converter 58, the sprag clutch 59, the endless gearing chain 60 and the output shaft 51 to help accelerate the vehicle. After reaching the desired cruising speed, the gas pedal 30 may be raised to a point above the slightly depressed position B to allow the vehicle to continue traveling economically on power from the primary engine 48 alone, perhaps supplemented as needed with power from the motor-generator 54 by simply dipping the gas pedal 30 in and/or below the slightly depressed position B, or even with power from the secondary engine 57 by dipping the gas pedal 30 in and/or below the moderately depressed position C.

Figure 4:
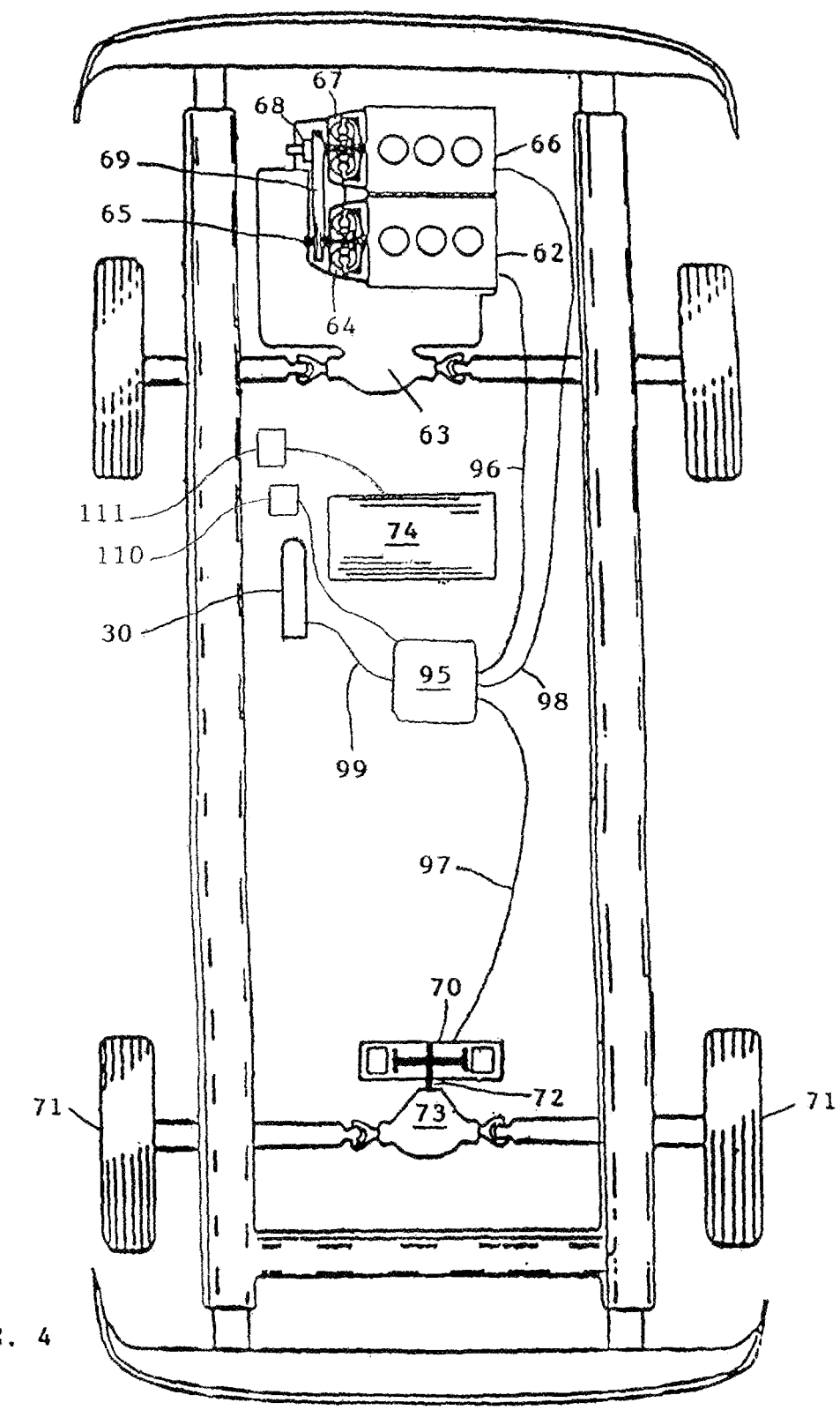
FIG. 4 is a schematic top view of a motor vehicle equipped with a third alternative embodiment of an improved power train of this invention.

In FIG. 4, a primary engine 62 is mated to a transaxle 63 via a primary fluid torque converter 64 and its output shaft 65 in the conventional manner. A secondary engine 66 is mated to a secondary fluid torque converter 67 whose output shaft is keyed to a cylindrical inner race of a sprag clutch 68 whose cylindrical outer race is geared to an endless gearing chain 69 which drives the output shaft 65 via a drive gearing sprocket. A motor-generator 70 drives a pair of wheels 71 via a pinion 72 and a differential 73. A rechargeable battery 74 supplies electric current to the motor-generator 70 via a rheostat associated with an engine management computer unit 95 where a cut off switch automatically cuts off power supply to the motor-generator 70 whenever a gear shift lever is shifted to "reverse." In this embodiment, any changes in the position of the gas pedal 30 is translated into electrical signals that are conveyed via a connection mechanism 99 to the engine management computer unit 95 which directs and manages the operation of the primary engine 62 via a connection mechanism 96, and also manages the operation of the motor-generator 70 via a connection mechanism 97, and still also manages the operation of the secondary engine 66 via a connection mechanism 98, all in accordance with pre-programmed algorithms.

These algorithms are of two type, namely Algorithm I and Algorithm II. Under Algorithm I, as shown in FIGS. 4 and 6, depression of the gas pedal 30 from the undepressed position A to the slightly depressed position B operates and speeds up the primary engine 62. Further depression of the gas pedal 30 between the slightly depressed position B and the moderately depressed position C sends increasing supply of electric current from the rechargeable battery 74 to the motor-generator 70, except when the gear shift lever is on "reverse." Finally, even further depression of the gas pedal 30 in and/or past the moderately depressed position C starts and then speeds up the secondary engine 66 which reaches maximum speed when the gas pedal 30 reaches the fully depressed position D.

To operate the vehicle under Algorithm I, the primary engine 62 is started and the gear shift lever is shifted to "drive." The gas pedal 30 is depressed in and/or below the undepressed position A to urge the vehicle forward on power from the primary engine 62, or depressed in and/or below the slightly depressed position B to accelerate faster on the combined power of the primary engine 62 and the motor-generator 70. To accelerate even faster, the gas pedal 30 is depressed in and/or below the moderately depressed position C which automatically starts the secondary engine 66, and further depression accelerates it to provide more power for faster acceleration. To cruise economically, the gas pedal 30 is simply raised to a point above the slightly depressed position B to travel on power from the primary engine 62 alone, or to a point in and/or below the slightly depressed position B to add power from the motor-generator 70.

Under Algorithm II, as shown in FIGS. 4 and 6, initial depression of the gas pedal 30 from the undepressed position A to the slightly depressed position B sends increasing supply of electric current from the rechargeable battery 74 to the motor-generator 70, except when the gear shift lever is on "reverse." Further depression of the gas pedal 30 between the slightly depressed position B and the moderately depressed position C starts and speeds up the primary engine 62. Finally, even further depression of the gas pedal 30 in and/or past the moderately depressed position C starts and then speeds up the secondary engine 66 which reaches maximum speed when the gas pedal 30 reaches the fully depressed position D.

To operate the vehicle under Algorithm II, the ignition switch is turned on and the gear shift lever is shifted to "drive." The gas pedal 30 is depressed in and/or below the undepressed position A to urge the vehicle forward on power from the motor-generator 70, or depressed in and/or below the slightly depressed position B to accelerate faster on the combined power of the primary engine 62 and the motor-generator 70. To accelerate even faster, the gas pedal 30 is depressed in and/or below the moderately depressed position C which automatically starts the secondary engine 66, and further depression accelerates it to provide more power for faster acceleration. To cruise economically, the gas pedal 30 is simply raised to a point above the slightly depressed position B to travel on power from the motor-generator 70 alone, or to a point in and/or below the slightly depressed position B to add power from the primary engine 62.

A switch 110, or an algorithm selection switch mechanism, is installed at a location convenient to the operator and is connected to the operator to switch from Algorithm I to Algorithm II and vice versa. This enables the operator to choose at any time to operate the vehicle using Algorithm I or Algorithm II.

A battery recharging mechanism 111 is connected to the rechargeable battery 74, and is adapted to permit the rechargeable battery 74 to be recharged with electricity from the grid, either from a residential outlet, or from a designated charging station. This gives the vehicle the capabilities of a "plug-in hybrid vehicle" or even a "plug-in electric vehicle augmented by a plurality of internal combustion engines." If the rechargeable battery 74 is chosen to be one having very high storage capacity capable of pure electric-powered travel for 100 or 200 miles, this vehicle will be comparable with current Electric Vehicles in terms of having high fuel efficiency and smooth quiet operation. Additionally, after the rechargeable battery 74 is exhausted, this vehicle can continue to travel economically for long distances using its primary engine 62, and accelerate quickly on added power from the secondary engine 66. In contrast, current Electric Vehicles would have to stop to recharge, possibly for hours.

Figure 5:
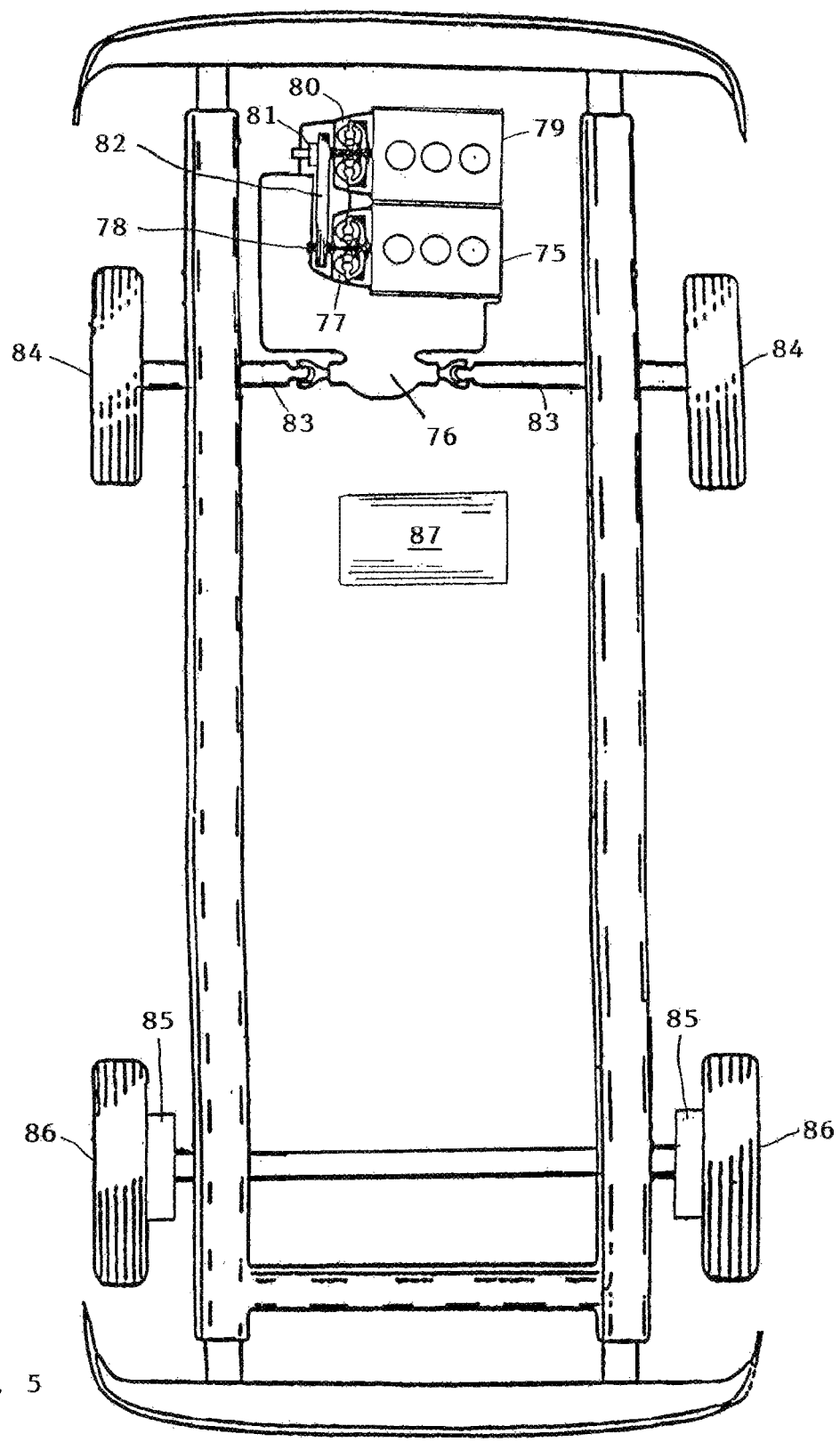
FIG. 5 is a schematic top view of a motor vehicle equipped with a fourth alternative embodiment of an improved power train of this invention.

In FIG. 5, a primary engine 75 is mated to a transaxle 76 via a primary fluid torque converter 77 and its output shaft 78. A secondary engine 79 transmits power via a secondary torque converter 80, a sprag clutch 81, an endless gearing chain 82 and the output shaft 78 to the transaxle 76, thence via two halfshafts 83 and a pair of wheels 84. Two motor-generators 85, such as in-wheel motor-generators, are installed in the pair of wheels 86, one to each wheel. The motor-generators of various power capacities are now becoming more available in the market, and they often simplify the process of converting a regular vehicle into a hybrid vehicle and may simplify its manufacture as well.

To operate the vehicle, the primary engine 75 is started and the gear shift lever of transaxle 76 is shifted to "drive" and the primary engine 75 is speeded up to urge the vehicle forward in the usual manner. Operation of the power train of this embodiment is done similarly to the foregoing embodiments, as shown in FIG. 6, by various degrees of depression of the gas pedal 30. To accelerate faster, the gas pedal 30 is depressed in and/or below the slightly depressed position B whereupon increasing supply of electric current is supplied to the motor-generators 85 from a rechargeable battery 87 via a rheostat controlled by the gas pedal 30. With increased supply of electricity, the motor-generators 85 will produce more power to assist the primary engine 75 in accelerating the vehicle. For even faster acceleration, the gas pedal 30 may be depressed in and/or below the moderately depressed position C whereupon the secondary engine 79 is automatically started and speeded up to cause the sprag clutch 81 to automatically engage and transmit power via the endless gearing chain 82 to the output shaft 78 to the transaxle 76 and supply more power for acceleration.

The motor-generator in each of the above embodiments may be programmed to switch into generator mode whenever the vehicular brakes are depressed and thereby generate electricity to recharge the rechargeable battery, a method known as regenerative braking which is well known in the prior art.

Although the primary and secondary engines shown in FIGS. 1, 3, 4 and 5 are three-cylinder "In-Line" engines, it is apparent to a person skilled in the art that various changes in the size, power and configuration of the engines may be made without departing from the spirit and scope of the invention. It is particularly noted that further down-sizing of the primary engine in these embodiments will further maximize fuel economy, and maximizing the power of the motor-generator and the secondary engine will similarly maximize acceleration, and changes of this nature may be made without departing from the spirit and scope of the invention.

Furthermore, although the fluid torque converter and the sprag clutch have been described and illustrated in the drawings and specifications above, it is to be understood that they are used for the purpose of illustration only, and that other suitable types of clutches, releasable couplings and torque converters may be used, such as dry plate clutches, cone clutches and toroidal torque converters. Furthermore any of these couplings may be designed to be automatically actuated using load sensors and speed sensors in association with programmed computerized vehicle management systems.

Similarly, although the gas pedal 30 has been illustrated in FIGS. 1 and 8 to be specifically connected individually to the primary engine 16 by the connection mechanism 90, to the motor-generator 28 by the connection mechanism 91, and to the secondary engine 22 by the connection mechanism 92, it is to be understood that, alternatively, the variations in the pedal positions can be converted into electrical signals that can be routed into a programmed engine management computer which will then manage the operation of the primary engine 16, the motor-generator 28 and the secondary engine 22 in accordance with pre-programmed management algorithms. Furthermore, a similar system may be used in any of the alternative embodiments, as illustrated in FIG. 4, and discussed in the accompanying description.

Although the preferred embodiments are described in great detail, it is to be understood that various changes and modifications may be made therein without departing from the scope of the invention as defined in the appended claims.

What is claimed is:

1. A vehicle system comprising:
a pedal;
a first internal combustion engine;
a second internal combustion engine;
an electric engine;
the first internal combustion engine, the second internal combustion engine and the electric engine being respectively coupled with the pedal;
the first internal combustion engine, the second internal combustion engine and the electric engine being operatively supplementary to one another;
a transaxle;
the transaxle being engaged with the first internal combustion engine;
the pedal being movable between an undepressed position, a slightly depressed position, a moderately depressed position and a fully depressed position;
the undepressed position, the slightly depressed position, the moderately depressed position and the fully depressed position being sequentially arranged in a downward direction;
the first internal combustion engine comprising a first minimal operating capacity, a first intermediate operating capacity and a first maximal operating capacity;
the second internal combustion engine comprising a second minimal operating capacity, a second intermediate operating capacity and a second maximal operating capacity;
the electric engine comprising a minimal engine operating capacity, an intermediate engine operating capacity and a maximal engine operating capacity;
a switch;
the switch being selectively manipulated in an internal combustion operation or an electric operation;
the first minimal operating capacity being determined in response to the pedal being situated in the undepressed position and the switch being manipulated in the internal combustion operation;
the first intermediate operating capacity being determined in response to the pedal being situated below the undepressed position and above the slightly depressed position and the switch being manipulated in the internal combustion operation;
the first maximal operating capacity being determined in response to the pedal being situated in and/or below the slightly depressed position and the switch being manipulated in the internal combustion operation;
the minimal engine operating capacity being determined in response to the pedal being situated in the slightly depressed position and the switch being manipulated in the internal combustion operation;
the intermediate engine operating capacity being determined in response to the pedal being situated below the slightly depressed position and above the moderately depressed position and the switch being manipulated in the internal combustion operation;
the maximal engine operating capacity being determined in response to the pedal being situated in and/or below the moderately depressed position and the switch being manipulated in the internal combustion operation;
the minimal engine operating capacity being determined in response to the pedal being situated in the undepressed position and the switch being manipulated in the electric operation;
the intermediate engine operating capacity being determined in response to the pedal being situated below the undepressed position and above the slightly depressed position and the switch being manipulated in the electric operation;
the maximal engine operating capacity being determined in response to the pedal being situated in and/or below the slightly depressed position and the switch being manipulated in the electric operation;
the first minimal operating capacity being determined in response to the pedal being situated in the slightly depressed position and the switch being manipulated in the electric operation;
the first intermediate operating capacity being determined in response to the pedal being situated below the slightly depressed position and above the moderately depressed position and the switch being manipulated in the electric operation;
the first maximal operating capacity being determined in response to the pedal being situated in and/or below the moderately depressed position and the switch being manipulated in the electric operation;
the second minimal operating capacity being determined in response to the pedal being situated in the moderately depressed position and the switch being manipulated in either the internal combustion operation or the electric operation;
the second intermediate operating capacity being determined in response to the pedal being situated below the moderately depressed position and above the fully depressed position and the switch being manipulated in either the internal combustion operation or the electric operation; and the second maximal operating capacity being determined in response to the pedal being situated in the fully depressed position and the switch being manipulated in either the internal combustion operation or the electric operation.

2. The vehicle system of claim 1 further comprising:

in response to the pedal moving in an upward direction opposite to the downward direction, the first intermediate operating capacity gradually decreasing toward the first minimal operating capacity, the second intermediate operating capacity gradually decreasing toward the second minimal operating capacity, and the intermediate engine operating capacity gradually decreasing toward the minimal engine operating capacity; and in response to the pedal moving in the downward direction, the first intermediate operating capacity gradually increasing toward the first maximal operating capacity, the second intermediate operating capacity gradually increasing toward the second maximal operating capacity, and the intermediate engine operating capacity gradually increasing toward the maximal engine operating capacity.

3. The vehicle system of claim 1 further comprising:
the electric engine being coupled with the first internal combustion engine.

4. The vehicle system of claim 1 further comprising:
another transaxle;
the another transaxle being opposite to the transaxle; and
the another transaxle being engaged with the electric engine.

5. The vehicle system of claim 1 further comprising:
a wheel;
the wheel comprising a hub; and
the electric engine being mounted on the hub.

6. The vehicle system of claim 1 further comprising:
a releasable engaging member; and
the releasable engaging member being disposed between the first internal combustion engine and the second internal combustion engine.

7. The vehicle system of claim 6 further comprising:
the first internal combustion engine, the releasable engaging member and the second internal combustion engine being selectively deployed in a parallel arrangement or a serial arrangement.

8. A vehicle system comprising:
a pedal;
a first internal combustion engine;
a second internal combustion engine;
an electric engine;
the first internal combustion engine, the second internal combustion engine and the electric engine being respectively coupled with the pedal;
the first internal combustion engine, the second internal combustion engine and the electric engine being operatively supplementary to one another;
a releasable engaging member;
the releasable engaging member being disposed between the first internal combustion engine and the second internal combustion engine;
the first internal combustion engine, the releasable engaging member and the second internal combustion engine being selectively deployed in a parallel arrangement or a serial arrangement;

the pedal being movable between an undepressed position, a slightly depressed position, a moderately depressed position and a fully depressed position;

the undepressed position, the slightly depressed position, the moderately depressed position and the fully depressed position being sequentially arranged in a downward direction;

the first internal combustion engine comprising a first minimal operating capacity, a first intermediate operating capacity and a first maximal operating capacity;

the second internal combustion engine comprising a second minimal operating capacity, a second intermediate operating capacity and a second maximal operating capacity;

the electric engine comprising a minimal engine operating capacity, an intermediate engine operating capacity and a maximal engine operating capacity;

a switch;

the switch being manipulated selectively manipulated in an internal combustion operation or an electric operation;

the first minimal operating capacity being determined in response to the pedal being situated in the undepressed position and the switch being manipulated in the internal combustion operation;

the first intermediate operating capacity being determined in response to the pedal being situated below the undepressed position and above the slightly depressed position and the switch being manipulated in the internal combustion operation;

the first maximal operating capacity being determined in response to the pedal being situated in and/or below the slightly depressed position and the switch being manipulated in the internal combustion operation;

the minimal engine operating capacity being determined in response to the pedal being situated in the slightly depressed position and the switch being manipulated in the internal combustion operation;

the intermediate engine operating capacity being determined in response to the pedal being situated below the slightly depressed position and above the moderately depressed position and the switch being manipulated in the internal combustion operation;

the maximal engine operating capacity being determined in response to the pedal being situated in and/or below the moderately depressed position and the switch being manipulated in the internal combustion operation;

the minimal engine operating capacity being determined in response to the pedal being situated in the undepressed position and the switch being manipulated in the electric operation;

the intermediate engine operating capacity being determined in response to the pedal being situated below the undepressed position and above the slightly depressed position and the switch being manipulated in the electric operation;

the maximal engine operating capacity being determined in response to the pedal being situated in and/or below the slightly depressed position and the switch being manipulated in the electric operation;

the first minimal operating capacity being determined in response to the pedal being situated in the slightly depressed position and the switch being manipulated in the electric operation;

the first intermediate operating capacity being determined in response to the pedal being situated below the slightly depressed position and above the moderately depressed position and the switch being manipulated in the electric operation;

the first maximal operating capacity being determined in response to the pedal being situated in and/or below the moderately depressed position and the switch being manipulated in the electric operation;

the second minimal operating capacity being determined in response to the pedal being situated in the moderately depressed position and the switch being manipulated in either the internal combustion operation or the electric operation;

the second intermediate operating capacity being determined in response to the pedal being situated below the moderately depressed position and above the fully depressed position and the switch being manipulated in either the internal combustion operation or the electric operation; and the second maximal operating capacity being determined in response to the pedal being situated in the fully depressed position and the switch being manipulated in either the internal combustion operation or the electric operation.

9. The vehicle system of claim 8 further comprising:

in response to the pedal moving in an upward direction opposite to the downward direction, the first intermediate operating capacity gradually decreasing toward the first minimal operating capacity, the second intermediate operating capacity gradually decreasing toward the second minimal operating capacity, and the intermediate engine operating capacity gradually decreasing toward the minimal engine operating capacity; and in response to the pedal moving in the downward direction, the first intermediate operating capacity gradually increasing toward the first maximal operating capacity, the second intermediate operating capacity gradually increasing toward the second maximal operating capacity, and the intermediate engine operating capacity gradually increasing toward the maximal engine operating capacity.

10. The vehicle system of claim 8 further comprising:
the electric engine being coupled with the first internal combustion engine.

11. The vehicle system of claim 8 further comprising:
a transaxle;
the transaxle being engaged with the first internal combustion engine;
another transaxle;
the another transaxle being opposite to the transaxle; and
the another transaxle being engaged with the electric engine.

12. The vehicle system of claim 8 further comprising:
a wheel;
the wheel comprising a hub; and
the electric engine being mounted on the hub.

13. A vehicle system comprising:
a pedal;
a first internal combustion engine;
a second internal combustion engine;
an electric engine;
the first internal combustion engine, the second internal combustion engine and the electric engine being respectively coupled with the pedal;
the first internal combustion engine, the second internal combustion engine and the electric engine being operatively supplementary to one another;

the pedal being movable between an undepressed position, a slightly depressed position, a moderately depressed position and a fully depressed position;

the undepressed position, the slightly depressed position, the moderately depressed position and the fully depressed position being sequentially arranged in a downward direction;

the first internal combustion engine comprising a first minimal operating capacity, a first intermediate operating capacity and a first maximal operating capacity;

the second internal combustion engine comprising a second minimal operating capacity, a second intermediate operating capacity and a second maximal operating capacity;

the electric engine comprising a minimal engine operating capacity, an intermediate engine operating capacity and a maximal engine operating capacity;

a switch;

the switch being selectively manipulated in an internal combustion operation or an electric operation;

the first minimal operating capacity being determined in response to the pedal being situated in the undepressed position and the switch being manipulated in the internal combustion operation;

the first intermediate operating capacity being determined in response to the pedal being situated below the undepressed position and above the slightly depressed position and the switch being manipulated in the internal combustion operation;

the first maximal operating capacity being determined in response to the pedal being situated in and/or below the slightly depressed position and the switch being manipulated in the internal combustion operation;

the minimal engine operating capacity being determined in response to the pedal being situated in the slightly depressed position and the switch being manipulated in the internal combustion operation;

the intermediate engine operating capacity being determined in response to the pedal being situated below the slightly depressed position and above the moderately depressed position and the switch being manipulated in the internal combustion operation;

the maximal engine operating capacity being determined in response to the pedal being situated in and/or below the moderately depressed position and the switch being manipulated in the internal combustion operation;

the minimal engine operating capacity being determined in response to the pedal being situated in the undepressed position and the switch being manipulated in the electric operation;

the intermediate engine operating capacity being determined in response to the pedal being situated below the undepressed position and above the slightly depressed position and the switch being manipulated in the electric operation;

the maximal engine operating capacity being determined in response to the pedal being situated in and/or below the slightly depressed position and the switch being manipulated in the electric operation;

the first minimal operating capacity being determined in response to the pedal being situated in the slightly depressed position and the switch being manipulated in the electric operation;

the first intermediate operating capacity being determined in response to the pedal being situated below the slightly depressed position and above the moderately depressed position and the switch being manipulated in the electric operation;

the first maximal operating capacity being determined in response to the pedal being situated in and/or below the moderately depressed position and the switch being manipulated in the electric operation;

the second minimal operating capacity being determined in response to the pedal being situated in the moderately depressed position and the switch being manipulated in either the internal combustion operation or the electric operation;

the second intermediate operating capacity being determined in response to the pedal being situated below the moderately depressed position and above the fully depressed position and the switch being manipulated in either the internal combustion operation or the electric operation; and the second maximal operating capacity being determined in response to the pedal being situated in the fully depressed position and the switch being manipulated in either the internal combustion operation or the electric operation.

14. The vehicle system of claim 13 further comprising:

in response to the pedal moving in an upward direction opposite to the downward direction, the first intermediate operating capacity gradually decreasing toward the first minimal operating capacity, the second intermediate operating capacity gradually decreasing toward the second minimal operating capacity, and the intermediate engine operating capacity gradually decreasing toward the minimal engine operating capacity; and in response to the pedal moving in the downward direction, the first intermediate operating capacity gradually increasing toward the first maximal operating capacity, the second intermediate operating capacity gradually increasing toward the second maximal operating capacity, and the intermediate engine operating capacity gradually increasing toward the maximal engine operating capacity.

15. The vehicle system of claim 13 further comprising:

the electric engine being coupled with the first internal combustion engine.

16. The vehicle system of claim 13 further comprising:

a transaxle;

the transaxle being engaged with the first internal combustion engine;

another transaxle;

the another transaxle being opposite to the transaxle; and the another transaxle being engaged with the electric engine.

17. The vehicle system of claim 13 further comprising:

a wheel;

the wheel comprising a hub; and the electric engine being mounted on the hub.

18. The vehicle system of claim 13 further comprising:

a releasable engaging member;

the releasable engaging member being disposed between the first internal combustion engine and the second internal combustion engine; and the first internal combustion engine, the releasable engaging member and the second internal combustion engine being selectively deployed in a parallel arrangement or a serial arrangement.

\* \* \* \* \*